Aug. 10, 1965     G. J. HEUER, JR., ETAL     3,199,341
METHOD AND APPARATUS FOR MEASURING COMPRESSIBILITY
OF POROUS MATERIAL
Filed May 28, 1962     2 Sheets-Sheet 2

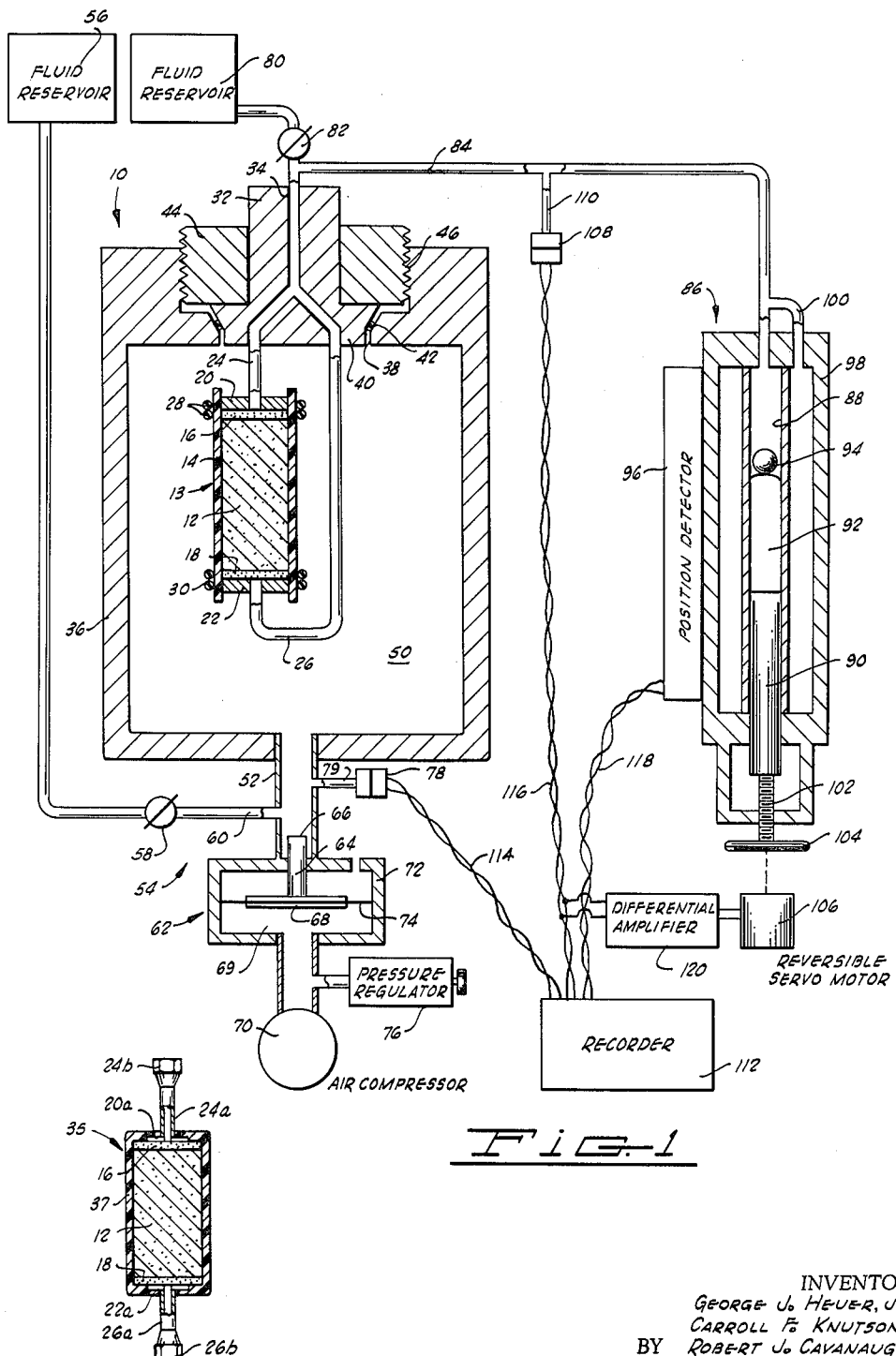

INVENTORS
GEORGE J. HEUER, JR.,
CARROLL F. KNUTSON,
BY ROBERT J. CAVANAUGH, &
CHARLES W. BRIGHT

ATTORNEY

United States Patent Office

3,199,341
Patented Aug. 10, 1965

3,199,341
METHOD AND APPARATUS FOR MEASURING
COMPRESSIBILITY OF POROUS MATERIAL
George J. Heuer, Jr., Carroll F. Knutson, Robert J. Cavanaugh, and Charles W. Bright, Ponca City, Okla., assignors to Continental Oil Company, Ponca City, Okla., a corporation of Delaware
Filed May 28, 1962, Ser. No. 198,314
10 Claims. (Cl. 73—94)

The present invention relates to measuring and testing, and more particularly, but not by way of limitation, relates to an improved method and apparatus for measuring the pore compressibility of a porous core sample obtained from a subterranean formation.

As is well known by reservoir engineers in the oil producing industry, many important calculations as to the quantity of oil reserves in a particular formation and the amount of oil reserves which can be recovered are dependent to a large extent upon the accuracy with which the compressibility of an oil-bearing formation can be determined. For example, oil trapped in the pore space of a subterranean rock formation is subjected to a very substantial pressure as a result of the weight of overlying layers of rock and earth resting on the particular oil-bearing formation. The pressure on the formation is known as the confining pressure acting on the particular oil-bearing formation. The oil and gas trapped within the formation has what may be termed an internal pressure which in most instances results principally from the hydrostatic head generated by in situ fluids. So long as the oil is in place in the pores of the oil-bearing formation, the oil will assist the oil-bearing formation in supporting the great weight of the upper formation. Therefore, the net compressive force on the formation is the difference between the pressure due to the overlying formations and the internal pressure, which is known as the net confining pressure. However, when a well is drilled into the oil-producing formation and the trapped oil permitted to escape, the pressure exerted by the oil is appreciably reduced and the net confining pressure thereby increased so that the oil-producing formation will actually be compressed by the weight of the overlying geological structures. In addition to any gas drive which may result from the expansion of gas at the high formation pressure, the compression of the formation also exerts a considerable drive which will force the oil reserve from the formation to the tapping well bore. The ultimate volume of oil which can be recovered in this manner can be calculated with reasonable accuracy if the compressibility of the oil-producing formation is known. The quantity of oil which can be produced in this manner is equal, roughly, to the initial volume of the pore space of the formation less the subsequent pore space volume as the oil is removed and the formation crushed much in the same manner that a sponge may be mashed to force water from its pores. The rate at which it may be expected to recover oil from the formation due to this particular drive mechanism is dependent on many additional factors, such as the rate at which the formation can be compressed and the permeability of the formation to the lateral flow of the oil to the various producing wells.

Therefore, it is an important object of the present invention to provide an improved method and apparatus for determining the compressibility of a porous material such as a sample of a geological formation. This is accomplished by applying a super-atmospheric internal fluid pressure to a sample of the porous material, the compressibility of which is to be determined, and applying a confining fluid pressure over at least a portion of the surface area of the sample. The confining fluid is maintained isolated from the internal fluid and the initial confining fluid pressure is at least as great as the internal fluid pressure. Thus the confining fluid pressure is incrementally increased by steps, preferably to preselected values, while the internal fluid pressure is maintained essentially constant. The volume of internal fluid which is displaced or squeezed from the sample of material after each incremental increase in confining fluid pressure is measured, and is a direct measure of the net change in pore space and therefore the compressibility of the sample of porous material. The rate at which the internal fluid is forced from the sample is also measured and provides direct data on the rate of compressibility.

Another very important object of the present invention is to provide a method and apparatus for simultaneously determining the rate of compression of a subterranean formation.

Still another object of the present invention is to provide a method and apparatus for measuring compressibility which eliminates any variables or errors which might otherwise arise due to the inability to completely saturate the sample with a liquid, due to the compressibility of the liquid in the sample, or due to the expansion of the measuring system as a result of an increase in pressure.

Another object of the present invention is to provide a method and apparatus of the type described wherein so-called hysteresis effects which would otherwise occur due to inability to resaturate the sample are substantially eliminated.

Another object of the present invention is to provide a method and apparatus of the type described which positively indicates when complete compression of the sample for a particular pressure has been reached.

Still another object of the present invention is to provide a method and apparatus of the type described which provides a positive indication of fluid leaks or other irregularities which may make the compressibility measurements unreliable.

Still another very important object of the present invention is to provide an improved apparatus of the type described which will function substantially automatically to maintain a constant pressure in the measuring system.

Yet another object of this invention is to provide a method and apparatus for determining the values of transient characteristics of a dynamic system from which values the pseudo-viscosity of a core may be determined.

Many additional objects and advantages will be evident to those skilled in the art from the following detailed description and accompanying drawings, wherein:

FIGURE 1 is a somewhat schematic diagram of one form of a novel measuring apparatus constructed in accordance with the present invention for performing the novel method of the present invention;

FIGURE 2 is an alternative type of encapsulation for sample of porous material used in compressibility measurements in accordance with the present invention;

Figure 3:
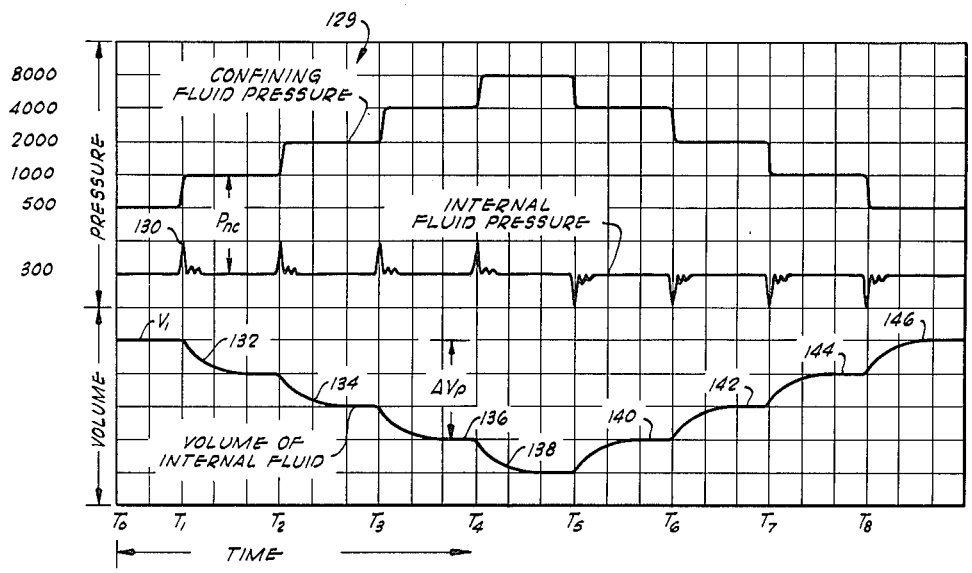
FIGURE 3 is a schematic representation of a typical recording chart illustrating the results of a typical measurement run on a sample of porous material.

Referring now to the drawings, and more particularly to FIGURE 1, an apparatus for measuring the compressibility of a porous material is indicated generally by the reference numeral 10. A typical cylindrical core sample 12 cut from a subterranean formation is encapsulated by an encapsulating means, indicated generally by the reference numeral 13, which is comprised of a flexible or easily deformable fluid-impervious sheath 14. The impervious, tubular sheath 14 may be fabricated from a synthetic plastic or any other material having similar impervious and flexible properties. The sheath 14 is telescoped tightly around the sample 12 and extends appreciably beyond each end. The encapsulating means 13 also includes a pair of fluid-permeable steel discs 16 and 18 which are positioned at opposite ends of the sample 12, and suitable headers 20 and 22 which are then placed against the discs 16 and 18, all within the flexible sheath 14. The discs 16 and 18 and the headers 20 and 22 should have substantially the same diameter as the cylindrical core sample 12. A pair of tubular conduits 24 and 26 pass through the headers 20 and 22 to provide fluid communication with the permeable steel discs 16 and 18. The discs 16 and 18 insure that any fluid passing through the conduits 24 and 26 is distributed over the entire areas of the ends of the sample 12. Means such as elastic bands 28 and 30 are provided around the ends of the flexible sheath 14, substantially as illustrated, to seal the ends of the sheath 14 against the headers 20 and 22 and the discs 16 and 18, thereby completely encapsulating the cylindrical core sample 12 and isolating the core sample from a confining fluid around the encapsulating means 13 as hereafter described in greater detail. The conduits 24 and 26 are connected to a plug member 32 and are in fluid communication with a single bore 34 through the plug 32. The conduits 24 and 26 may be very small and preferably are fabricated from a very strong steel so as to be relatively incompressible.

Another means for encapsulating the cylindrical core sample 12 is shown in FIGURE 2 and is indicated generally by the reference numeral 35. The permeable steel discs 16 and 18 are positioned against the ends of the sample 12 and suitable header plates 20a and 22a to which conduits 24a and 26a are connected are placed in position substantially as shown. The conduits 24a and 26a are in fluid communication with the permeable steel discs 16 and 18 and are provided with couplings 24b and 26b for connection in an internal fluid system hereafter described. A relatively thin coat of fluid-impervious, flexible plastic material 37 is then molded completely around the header plates 20a and 22a, the permeable steel discs 16 and 18, and the core sample 12 to effectively encapsulate the sample and isolate a confining fluid around the capsule from the interior of the sample.

The encapsulated sample 12 may be inserted in a fluid bomb or pressure vessel 36 through a tapered top opening 38. The plug member 32 is provided with a lower flange portion 40 having a similar peripheral taper and an O-ring 42 to make a fluid-tight seal. A threaded nut 44 encompasses the body of the plug and is threaded into a counterbore 46 in the upper end of the pressure vessel 36 to tightly and securely seat the plug 32 in the opening 38 and completely close the pressure vessel 36 to form a confining fluid chamber 50 as hereafter described in greater detail.

The confining fluid chamber 50 is in fluid communication through a suitable conduit 52 with a suitable source of high pressure fluid, indicated generally by the reference numeral 54. The high pressure fluid may be either liquid or gas, although liquid is preferred, and any one of a number of conventional fluid pressure sources may be suitable, provided that a constant high pressure can be maintained with considerable accuracy. The particular source of high pressure fluid disclosed comprises a fluid reservoir 56 which communicates with the confining fluid chamber 50 through a stopcock 58 and through conduits 60 and 52. Liquid rather than gas is the preferred fluid in the disclosed system so that when the confining fluid chamber 50 and associated system is completely filled with liquid a conventional pressure amplifier, illustrated schematically and indicated by the reference numeral 62, may be conveniently utilized to produce and maintain the desired pressure even though the volume demanded may vary.

The pressure amplifier 62 has a differential area piston 64 having a small working area 66 exposed to the liquid in the conduit 52, which communicates with the confining fluid chamber 50, and a large working area 68 which is exposed to fluid pressure in a chamber 69 formed by a flexible diaphragm 74 connected to the differential area piston and to a suitable housing 72. An air compressor 70 is connected to supply air pressure to the chamber 69 and an adjustable pressure regulator 76 is provided for maintaining the air within the chamber 69 at any selected pressure. A conventional pressure transducer 78 is in fluid communication with the confining fluid in the confining fluid chamber 50 through a conduit 79, and provides an accurate indication of the fluid pressure within the conduit 52 and therefore within the confining fluid chamber 50. A conventional pressure gauge may be used, but a pressure transducer, which is a semiconductor device which either generates a voltage or varies in conductance in proportion to the pressure exerted on the semiconductor material, is preferred because the volume of fluid required to operate the pressure measuring device is greatly reduced.

Thus it will be noted that when the stop-cock 58 is closed, a closed confining fluid system comprised of the confining fluid chamber 50 and the conduits 52, 60 and 79 is provided. The pressure of the fluid in the confining fluid system is produced by the air pressure in the chamber 69. A relatively low air pressure acting on the larger working area 68 forces the piston 64 into the confining fluid system until a much greater fluid pressure acting on the smaller working area 66 counterbalances the movement. It will be appreciated that very little movement will be required if an incompressible fluid fills the confining fluid system. The pressure in the confining fluid system may easily be varied by changing the setting of the pressure regulator 76.

Fluid is supplied to the system communicating with the interior of the encapsulated sample 12 from a fluid reservoir 80 through a stop-cock 82 and to the passageway 34. The fluid in the reservoir 80 is preferably a relatively incompressible hydraulic fluid, although the fluid may be a gas since a constant measuring pressure is to be maintained and will thereby eliminate volumetric variations as hereafter described in greater detail. A conduit 84 is connected to the passageway 34 and to a fluid volumetric measurement device indicated generally by the reference numeral 86. The volumetric measuring device 86 may be any one of several conventional types, but preferably employs a measuring cylinder 88 having a relatively small diameter in which a piston 90 is reciprocally disposed. A column of mercury 92 may conveniently be provided as a fluid seal to prevent leakage past the piston 90. A magnetic ball 94 will float on the upper surface of the column of mercury. The position of the magnetic ball 94 within the cylinder 88 may then conveniently be detected by any one of a number of conventional position detecting devices, indicated by the reference numeral 96. The cylinder 88 has a constant diameter such that changes in the position of the magnetic ball 94 are a direct indication of the change in volume of the fluid within the measuring cylinder 88. The measuring cylinder 88 is preferably contained within a housing 98 and a fluid bypass 100 may be provided to equalize the fluid pressure acting on each side of the walls of the measuring cylinder 88 to prevent distortion of the cylinder by pressures. The piston 90 may be reciprocally moved within the measuring cylinder 88 by a threaded rod 102 which may be rotated alternately by a hand wheel 104 or by an electric servo motor 106 as hereafter described in greater detail. A pressure transducer 108 is in fluid communication with the conduit 84 through a conduit 110 to measure the fluid pressure within the conduit 84. Use of a pressure transducer rather than a more conventional mechanical pressure gauge is particularly desirable because of the substantially smaller volume of fluid required to operate the device as heretofore described in connection with the transducer 78.

As previously noted, a confining fluid system is comprised of the confining fluid chamber 50 and the conduits 52, 60 and 79. Similarly, when the stop-cock 82 is closed, a closed internal fluid system is comprised of the interior of the sheath 14, including the pore space in the sample 12, the conduits 24 and 26, the passageway 34, the conduits 84 and 110 and the fluid bypass 100, the interior of the measuring cylinder 88 and the interior of the housing 98. It will be noted that the pressure of the fluid in the closed internal fluid system may be increased by moving the piston 90 upwardly further into the measuring cylinder 88 and decreased by moving the piston downwardly. Further, when fluid is forced from the sample 12, the pressure in the confining fluid system can be maintained constant only if the piston 90 is lowered to allow the displaced fluid to enter the measuring cylinder 88. Therefore, movement of the magnetic ball downwardly is a direct indication of the quantity of fluid which may be displaced from the encapsulated sample 12 as hereafter described.

The pressure of the fluid in the confining fluid system as measured by the pressure transducer 78, the pressure of the fluid in the internal fluid system as measured by the transducer 108, and the volume of the internal fluid system as determined by the position detector 96 are recorded by a three-stylus recorder 112 which is connected to the three sensory devices by leads 114, 116 and 118 respectively. These values may conveniently be recorded simultaneously on a single roll of recording paper which is moved at a constant rate so that the three traces will be correlated with respect to time. The recorder 112 may be any one of several conventional designs presently available on the commercial market.

The pressure within the internal fluid system may be automatically maintained constant for purposes subsequently to be described by a differential amplifier 120 which is connected to drive the reversible servo motor 106, which in turn is connected to rotate the threaded rod 102. The differential amplifier 120 may pick the signal from the pressure transducer 108 and compare it with a preselected voltage imposed on a conventional bridge network, and then amplify any difference to drive the reversible servo motor 106 in the proper direction and thereby move the piston 90 to adjust the volume of the internal fluid system in such a manner as to maintain a constant pressure. The specific electrical circuitry and servo motor for performing this function may be any one of several presently known in the art and accordingly is not illustrated in detail.

In order to determine the compressibility of a sample 12 for example, the sample is first saturated with one or more fluids, preferably liquids. The fluids used to saturate the sample are preferably the same material that is used in the internal fluid system and may be one or more of the following: water, brine, a hydrocarbon, or any other similar liquid preferably having a relatively low compressibility and preferably a low viscosity. If desired the internal fluid may be a compressible gas because, as will hereafter be explained in greater detail, the internal fluid pressure is to be maintained constant. When using the encapsulating means 13, the sheath 14 may be applied to the core sample 12. A vacuum may be applied to one end of the sheath 14 to draw air from the core sample and the liquid drawn in to replace the air. After the sample 12 is saturated, the permeable steel discs 16 and 18 and the headers 20 and 22 may be inserted in position and the elastic bands 28 and 30 applied to encapsulate the sample 12. In the event the sample 12 is encapsulated by the encapsulating means 35, as illustrated in FIGURE 2, the sample may be conveniently saturated simply by applying a suction to the conduit 26a while supplying liquid through the conduit 24a, in which case the conduits 24a and 26a may be connected in the saturating system by the couplings 24b and 26b.

After the sample 12 has been saturated, encapsulated and connected to the plug 32, it is inserted through the opening 38 into the pressure vessel 36. The plug 32 is lowered until the tapered portion of the flange portion 40 abuts against the periphery of the opening 38 and the nut 44 is tightened to compress the O-ring 42 and make a fluid-tight seal which will withstand high pressures. Next the confining fluid chamber 50 and the remainder of the confining fluid system is completely filled with hydraulic oil or a similar incompressible liquid. Again it will be appreciated that a compressible gas may be used in the confining system if desired, although use of a compressible gas creates problems in establishing and maintaining various high pressures required as hereafter described in greater detail. The pressure of the confining fluid in the confining fluid chamber 50 should then be increased to a relatively low pressure, for example 500 p.s.i., in order to test the isolation between the confining fluid system and the internal fluid system. This may be accomplished merely by activating the air compressor 70 and adjusting the pressure regulator 76 which controls the pressure of the air applied to the input of the pressure amplifier 62. It will be appreciated that the large effective working area 68 of the pressure amplifier which is subjected to air from the air compressor 70 as regulated by the pressure regulator 76 may be many times larger than the effective working area 66. Therefore, a relatively low pressure acting against the larger working area 68 will generate a much greater hydraulic pressure within the confining fluid chamber 50 by movement of the piston member 64 until the pressure acting on the small working area 66 counteracts the air pressure acting on the larger working area 68. This arrangement also insures that the pressure within the confining fluid chamber 50 remains constant regardless of the volume of the sample 12 since the compressor 70 is continually supplying air under pressure to the chamber 69 and the pressure regulator 76 is venting only so much of that air as is required to maintain the desired pressure.

After the encapsulated sample 12 is tested for leaks by increasing the pressure in the confining fluid chamber 50, the internal fluid system is filled with the preferred incompressible liquid, the system purged of air and the stopcock 82 closed. A fixed volume of liquid will then be trapped in the internal fluid system comprised of the liquid-saturated, encapsulated sample 12, the header assemblies, the conduits 24 and 26, passageway 34, conduits 84 and 110, the fluid bypass 100, the interior of the housing 98 and the interior of the measuring cylinder 88 above the column of mercury 92. This same volume of liquid will be retained in the internal fluid system throughout the measurement run hereafter described in greater detail.

After the internal fluid system and the confining fluid system have been completely filled with liquid and tested, the pressures of the two liquids are increased to some selected starting pressures for a measurement run. Typical initial pressures for a measurement run would be 300 p.s.i. for the internal fluid pressure system and 500 p.s.i. for the confining fluid system. Care should be taken that the pressure of the internal fluid system does not exceed the pressure of the confining fluid system at any time. The volume of the internal fluid system will be indicated by the position of the magnetic ball 94, and the pressure of the internal system will be indicated by the pressure transducer 108. Similarly, the confining fluid pressure will be measured by transducer 78. Although these values may be recorded by visual observation and manual recordation of the fixed points, it is preferred that the values be continuously recorded with respect to time by the recorder 112. A typical record chart from the recorder 112 during a measurement run is indicated generally by the reference numeral 129 in FIGURE 3. The horizontal axis of the chart represents elapsed time and permits a determination of rate of compressibility as will hereafter be described. The lower half of the vertical axis may be calibrated in volume units for the internal fluid system, and the upper half of the vertical axis may be calibrated in pressure units for recording both the pressure in the internal fluid system and the pressure in the confining fluid system. The pressure axis is preferably calibrated as a logarithmic scale in order to consolidate and produce a more useable record.

Assume now that at time $T_0$ the pressure of the confining fluid in the confining fluid chamber 50 is adjusted to 500 p.s.i. and the pressure of the internal fluid is adjusted to 300 p.s.i., the encapsulated core sample 12 will be subjected to a net confining pressure of 200 p.s.i. and will have an initial volume, $V_1$, as indicated on the record chart 129. Next the confining fluid pressure is incrementally increased while maintaining the internal fluid pressure constant. It has been found that it is usually desirable to double the confining pressure for each successive step of the measurement run in order to produce approximately equal decreases in volume of the pore space of the sample 12. Accordingly, assume that the confining pressure is increased at time $T_1$ to 1000 p.s.i. by adjustment of the pressure regulator 76. Since the flexible sheath 14 is easily compressible and the headers 20 and 22 are free to move toward the center of the sheath 14, the sample 12 will be compressed by the increase in the net confining pressure from 200 p.s.i. to 700 p.s.i. The pressure in the internal fluid system will rise sharply, as indicated by the peak 130 in FIGURE 3, if the piston 90 is to be operated manually by the hand wheel 104. However, as soon as the piston 90 is withdrawn from the measuring cylinder 88 to increase the volume of the measuring cylinder 88 an amount equal to the decrease in volume of the sample 12, the internal fluid pressure will be reduced back to 300 p.s.i. The pressure peak indicated at 130 illustrates a run in which the internal fluid pressure was maintained constant by manual adjustment of the hand wheel 104. Accordingly, for a short period of time until the hand wheel 104 can be manipulated, the internal fluid pressure will exceed 300 p.s.i. If the reversible servo motor 106 is used, the internal fluid pressure can quite accurately be maintained at a constant pressure of 300 p.s.i., for example, even when the pressure of the confining fluid is increased sharply. As the piston 90 is lowered and therefore withdrawn from the volume measuring cylinder 88, the magnetic ball 94 will be lowered to increase the volume of the cylinder 88. Since the pressure of the internal fluid system is maintained constant, the increase in the volume of the measuring cylinder 88 is precisely the same as the decrease in the volume of the sample 12, which may be represented by the portion 132 of the volumetric curve of FIGURE 3. It will be noted from the portion 132 of the volumetric curve that the volume decreases quite rapidly when the confining fluid pressure is first increased and then becomes more and more gradual until equilibrium is established as represented by the horizontal portion of the curve.

The confining fluid pressure is successively increased to 2,000, 4,000 and 8,000 p.s.i. at times $T_2$, $T_3$ and $T_4$ while the internal fluid pressure is maintained constant at 300 p.s.i. to produce additional decreases in the volume of the core sample 12 as represented by the portions 134, 136 and 138 of the volumetric curve. After the confining fluid pressure has been increased to a desired maximum, such as 8,000 p.s.i., the confining fluid pressure is successively decreased to 4,000, 2,000, 1,000 and 500 p.s.i. while continuing to maintain the internal fluid pressure constant at 300 p.s.i. The decreases in the confining fluid pressure will result in increases in the volume of the internal fluid within the sample 12 as represented by the portions 140, 142, 144 and 146 of the volumetric curve. It will be appreciated that before the confining fluid pressure is increased from one pressure step to the next, care should be taken to insure that the sample 12 has been fully compressed and equilibrium has been established. This can readily be determined by noting when the volume curve leaves out or stabilizes at a particular volume. Not infrequently, each pressure step will extend over several hours before equilibrium is established, and on some occasions may last for a day or two. It will be noted that the volume of the internal fluid at the various pressure steps as the confining fluid pressure was decreased should equal the volume at the corresponding pressure steps as the confining fluid pressure was increased. Then when the confining fluid pressure is finally reduced to the initial confining fluid pressure, the final volume of the internal fluid should equal the initial volume of the internal fluid if the run has been conducted successfully. If there is a greater volume of fluid after the run it may be evidence that a portion of the higher pressure confining fluid has leaked into the internal fluid system and that the data is not reliable.

Figure 4:
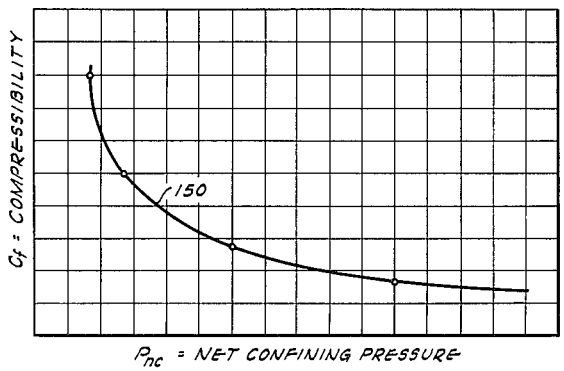
FIGURE 4 is a chart depicting the relationship between compressibility and confining pressure of a typical sample which utilizes data acquired by the method of the present invention.

From the data obtained by the run graphically illustrated in FIGURE 3, the compressibility of the sample 12 can be plotted against the net confining pressure by the formula:

$$C_f = \frac{1}{V_p} \cdot \frac{(\Delta V_p)}{(\Delta P_{nc})}$$

where $V_p$ is the pore volume of the sample 12, $P_{nc}$ is the net confining fluid pressure which is the confining fluid pressure minus the internal fluid pressure, and $C_f$ is the compressibility factor. The curve 150 shown in FIGURE 4 is a typical example of such a plot.

As mentioned above, each constant pressure step of the measuring run will require from several hours to several days before equilibrium is established, such that manual adjustment of the internal fluid pressure will not, as a practical matter, produce a completely smooth volume curve in FIGURE 3. However, by utilizing the servo motor 106 to continuously maintain the internal fluid pressure constant, in which case the pressure peak 130 would be eliminated, the curvature of the volumetric graph will be smooth and will accurately represent the compressibility of the core sample 12. As previously indicated, rate data is very useful for evaluating the pseudoviscous behavior of some formations such as shales and some carbonates and in estimating the period of time which will be required to produce the recoverable oil from a particular reservoir.

Therefore, it will be noted that a novel method and apparatus for determining both the compressibility and the rate of compressibility of a porous material has been disclosed. The novel method very closely duplicates the existing conditions in a particular subsurface oil-bearing formation in that an internal fluid pressure is established within the pore space of a sample of the formation and an external or confining pressure envelops the sample in much the same manner as the actual overlying layers of rock formations to produce a net confining pressure tending to compress the sample. As the confining fluid pressure is increased and the internal fluid pressure maintained constant, the net confining fluid pressure is increased to simulate the increase in net confining pressure which occurs as oil is removed from a subsurface formation due to the reduction of the pressure of the oil in place. However, by maintaining the internal fluid pressure constant, any air or other compressible gas which might be present in the internal fluid system due to an inability to completely saturate the sample or to purge all air from the internal fluid system will not affect the measurements. Similarly, expansion of the conduits and the like of the internal fluid system which are not subjected to the confining pressure within the pressure vessel 36 is eliminated. However, it may be desirable to make some corrections in order to compensate for the compression of the conduits 24 and 26 due to increases in the confining fluid pressure, but these corrections will be very slight.

The system utilizes sufficient pressure that the pressure-volume changes are, relatively speaking, rapid and easily determined. The relatively high internal fluid pressure virtually assures that as the confining fluid is successively decreased from the maximum pressure, the internal fluid will be forced back into the core sample to permit a double check of the volume measurements at each successive confining fluid pressure and eliminates hysteresis effects due to inability to re-saturate the sample. But even more important, when the confining fluid pressure is finally reduced to the initial pressure, the final volume of the sample should equal the initial volume. If not, the data is unreliable because isolation between the two fluid systems has not been maintained or the data is reliable but pseudoviscous flow may have taken place. By continually plotting the three variables with respect to time, and particularly the volume with respect to time, the rate of compressibility can be determined. When the rate of compressibility reaches zero, as indicated by a leveling off of the volume curve, it will be obvious that equilibrium has been established and true compressibility data for that particular net confining pressure has been attained so that the confining pressure may be increased to the next higher value. Otherwise, so long as the volume continues to change, equilibrium has not been attained and a final reading cannot be taken.

The fact that the volume continues to change while precluding a final reading does not mean that the data up to that point is of no consequence. Continued change in the volume curve after a reasonable length of time may indicate two possible conditions. If, for instance, the volume curve changes at a substantially constant rate, this will indicate a leak in the system which, of course, will preclude further measurements. On the other hand, the volume curve may taken an exponential form. When this occurs, it indicates that plastic deformation of the rock itself, or pseudoviscous flow, is taking place. Under these circumstances, advantage may be taken of the curve to determine an index of the pseudoviscosity of the core.

The determination of pseudoviscosity may be made from the following formula:

$$\frac{dV_p}{V_p} = \frac{1}{f}\left(cb + \frac{\frac{\partial E_b}{\partial t}}{}\right)(d\bar{\sigma} - dp_i)$$

wherein:

$V_p$ = initial pore volume $f$ = fractional porosity $cb$ = bulk compressibility $\approx fcp$ $\frac{\partial E_b}{\partial t}$ = pseudoviscosity of rock $d\bar{\sigma}$ = change of confining pressure $dp_i$ = change of internal pressure In the above formula, the fractional porosity, initial pore volume and bulk compressibility may be determined by other experimental apparatus and techniques which are well known in the art. The change in confining pressure can be determined from the curve and will, in the case of the curve presented herein, be constant at 500. Similarly, the change in internal pressure will, with the present system, amount to 0 when a proper $\partial t$ value is chosen. The value of $dV_p$ can, of course, be taken directly from the curve.

As will be apparent to one skilled in the art, these values may be obtained and the equation solved in a number of different ways. Generally, it will be found advisable to solve the equation using a digital computer.

Although particular embodiments of the present invention have been described in detail, it is to be understood that various changes, substitutions and alterations can be made in the steps of the method, in the components of the apparatus and in the combination of the components of the apparatus without departing from the spirit and scope of the present invention as defined by the appended claims.

What is claimed is:

1. A method for measuring the compressibility of a porous material comprising the steps of:
    applying an internal fluid pressure to a sample of the porous material;
    applying an initial confining fluid pressure over at least a portion of the surface area of the sample of the material while maintaining the confining fluid pressure isolated from the internal fluid pressure, the initial confining fluid pressure being at least as great as the internal fluid pressure;
    increasing the confining fluid pressure;
    maintaining the internal fluid pressure essentially constant; and,
    measuring the volume of fluid displaced from the sample of material.

2. A method for measuring the compressibility of a porous material comprising the steps of:
    applying a first fluid to the interior of the material to saturate the sample and placing the first fluid under a superatmospheric pressure;
    applying a second fluid to the exterior of the material, the second fluid being under a pressure at least as great as the pressure of the first fluid;
    increasing the pressure of the second fluid;
    maintaining the pressure of the first fluid substantially constant; and
    measuring the volume of the first fluid displaced from the material by the increase in the pressure of the second fluid.

3. A method for measuring the compressibility of a porous material comprising the steps of:
    encasing a sample of the material in a liquid-impervious, easily compressible jacket;
    applying an internal liquid to the interior of the jacket to saturate the sample;
    applying a liquid to the exterior of the jacket at a pressure greater than atmospheric;
    increasing the internal liquid pressure of the sample to a level not greater than the pressure of said external liquid;
    increasing the pressure of the external liquid;
    maintaining the pressure of the internal liquid substantially constant; and,
    measuring the volume of the internal liquid displaced from within the jacket by the increase in the pressure of the internal liquid.

4. A method for measuring the compressibility of a porous material comprising the steps of:
    saturating a sample of the material with a liquid;
    encasing the saturated sample of the material in a liquid-impervious, easily compressible jacket;
    confining the jacketed sample in external liquid, this external liquid being under a pressure appreciably greater than atmospheric;
    applying pressure to the liquid within said sample to the interior of the jacket at a pressure appreciably less than that of said first liquid;
    increasing the pressure of the external liquid while maintaining the pressure of the internal liquid substantially constant; and,
    measuring the volume of the internal liquid displaced from within the jacket by the increase in the pressure of the external liquid as a result of compression of the jacket and the sample encased therein.

5. A method for measuring the rate of compressibility of a porous material comprising the steps of:
    encasing a sample of the material in a liquid-impervious, easily compressible jacket;

applying an internal liquid to the interior of the jacket to saturate the sample;

applying an external liquid to the exterior of the jacket under pressure;

increasing the internal liquid pressure to a level not greater than the pressure of the external liquid;

increasing the pressure of the external liquid to a preselected value;

maintaining the pressure of the internal liquid constant; and, measuring and recording the volume of the internal liquid displaced from within the jacket with respect to time.

6. An apparatus for measuring the compressibility of a porous material comprising:

a fluid pressure vessel;

fluid-impervious, readily deformable encapsulating means for enclosing a sample of the porous material disposed in the pressure vessel;

means connected to the pressure vessel for supplying fluid under pressure to the pressure vessel;

conduit means connected to the encapsulating means for supplying fluid under superatmospheric pressure to the interior of the encapsulating means;

means connected to the conduit means for measuring the volume of fluid displaced from the interior of the encapsulating means, said means including a fluid displacing element; and constant pressure means for maintaining a constant fluid pressure within the encapsulating means, said constant pressure means comprising:

means for detecting the fluid pressure within the encapsulating means and producing a signal indicative of the measured pressure, and servo means connected to said detecting means and responsive to the signal therefrom, said servo means being coupled to said fluid displacing element whereby said element is moved by said servo means in response to changes in said signal.

7. An apparatus for measuring the compressibility of a porous material comprising:

a fluid pressure vessel;

fluid-impervious, readily deformable encapsulating means for encasing a sample of the porous material disposed in the pressure vessel;

means connected to the pressure vessel for supplying fluid under pressure to the pressure vessel;

conduit means connected to the encapsulating means for supplying fluid under superatmospheric pressure to the interior of the encapsulating means;

means connected to the conduit means for measuring the volume of fluid displaced from the interior of the encapsulating means and producing an electrical signal proportional to the measured volume;

means connected to the conduit means for measuring the pressure within the encapsulating means and producing an electrical signal proportional to the measured pressure, said means comprising a positive displacing element for moving fluid within the interior of the last-named means;

means connected to the pressure vessel for measuring the pressure within the pressure vessel and producing an electrical signal proportional to the measured pressure; and recording means electrically connected to the last three mentioned means for simultaneously recording the pressure of the fluid within the encapsulating means, the pressure within the pressure vessel and the volume of fluid displaced from the interior of the encapsulating means; and means for maintaining a constant pressure within said encapsulating means, said constant pressure means comprising:

a reversible servo motor electrically connected to and responsive to said means for measuring the pressure within the encapsulating means, said servo motor being operatively coupled to said positive displacing element within the means for measuring the volume of fluid displaced, whereby changes of pressure detected by said pressure measuring means are automatically corrected by actuation of said positive displacing element by said servo motor.

8. An apparatus for measuring the compressibility of a porous material comprising:

a fluid pressure vessel;

fluid-impervious, readily deformable encapsulating means for encasing a sample of the porous material disposed in the pressure vessel;

means connected to the pressure vessel for supplying fluid under pressure to the pressure vessel;

conduit means connected to the encapsulating means for supplying fluid under superatmospheric pressure to the interior of the encapsulating means;

means connected to the conduit means for measuring the volume of fluid displaced from the interior of the encapsulating means and producing an electrical signal proportional to the measured volume, said measuring means comprising:

a measuring cylinder in fluid communication with the interior of the encapsulating means, piston means reciprocally disposed in the cylinder to displace fluid therefrom, means for reciprocally moving the piston means in the cylinder for adjusting the pressure within the cylinder and within the encapsulating means, and means for detecting the position of the piston to thereby determine the volume of fluid within the cylinder, means connected to the conduit means for measuring the pressure within the encapsulating means and producing an electrical signal proportional to the measured pressure;

means connected to the pressure vessel for measuring the pressure within the pressure vessel and producing an electrical signal proportional to the measured pressure; and recording means electrically connected to the last three mentioned means for simultaneously recording the pressure of the fluid within the encapsulating means, the pressure within the pressure vessel and the volume of fluid displaced from the interior of the encapsulating means.

9. An apparatus for measuring the compressibility of a porous material as defined in claim 8 wherein the means for reciprocally moving the piston means comprises:

electrically actuated servo means electrically connected to the means connected to the conduit means for measuring the pressure within the encapsulating means for automatically positioning the piston means in the cylinder and maintaining the pressure within the encapsulating means constant.

10. An apparatus for measuring the compressibility of a porous material as defined in claim 8 wherein the means connected to the pressure vessel for supplying fluid under pressure to the pressure vessel comprises:

a source of liquid connected by a second conduit means to the vessel for filling the vessel with liquid;

a valve means in the second conduit means for closing the liquid in the vessel;

pressure amplifier means including a differential area piston member having a small working area and a large working area, the small working area being exposed to liquid in fluid communication with the interior of the vessel;

means for continually applying fluid under pressure to the large working area; and adjustable pressure regulating means connected to regulate the pressure of the fluid applied to the large working area.

References Cited by the Examiner

UNITED STATES PATENTS

| | | | |
|---|---|---|---|
| 2,705,418 | 4/55 | Reichertz et al. | 73—38 |
| 2,737,804 | 3/56 | Herzog et al. | 73—38 |
| 2,842,958 | 7/58 | Sayre et al. | 73—38 |
| 3,018,660 | 1/62 | Schmid | 73—38 X |

OTHER REFERENCES

Carpenter et al.: Bureau of Mines Report of Investigations, R.I. 3540, October 1940, "Measurements of Compressibility of Consolidated Oil-Bearing Sandstones," pages 1–12.

RICHARD C. QUEISSER, *Primary Examiner.*

DAVID SCHONBERG, *Examiner.*